United States Patent [19]
Okada

[11] Patent Number: 5,729,295
[45] Date of Patent: Mar. 17, 1998

[54] IMAGE SEQUENCE ENCODING DEVICE AND AREA EXTRACTING DEVICE

[75] Inventor: Hiroyuki Okada, Ashikaga, Japan

[73] Assignee: Sharp Kabushiki Kaisha, Osaka, Japan

[21] Appl. No.: 563,003

[22] Filed: Nov. 27, 1995

[30] Foreign Application Priority Data

Dec. 27, 1994 [JP] Japan .................................. 6-325489

[51] Int. Cl.⁶ .................................................. H04N 7/36
[52] U.S. Cl. .................................... 348/416; 348/420
[58] Field of Search ................................ 348/384, 390, 348/405, 409, 412, 413, 415, 416, 420, 699, 700, 419; 358/433

[56] References Cited

U.S. PATENT DOCUMENTS

| | | | |
|---|---|---|---|
| 5,253,075 | 10/1993 | Sugiyama | 358/433 |
| 5,475,502 | 12/1995 | Lee et al. | 348/384 |
| 5,526,052 | 6/1996 | Ar | 348/405 |
| 5,532,746 | 7/1996 | Chang | 348/700 |
| 5,572,258 | 11/1996 | Yokoyama | 348/420 |

OTHER PUBLICATIONS

R. H. J. M. Plompen et al, An Image Knowledge Based Video Codec for Low Bitrates, Apr. 03, 1987, pp. 1–12.

*Primary Examiner*—Amelia Au

[57] ABSTRACT

In an image sequence encoding device, a specified area and a motion area are extracted from an input image and encoded by allocating a relatively increased amount of codes to the specified area and a relatively reduced amount of codes to the motion area to improve the quality of the specified area of the image. The image sequence encoding device is provided with a specified area extracting portion connected to a frame memory to extract a specified area from an input image; a motion area extracting portion connected to a motion detecting portion to extract a motion area according to a magnitude of motion vectors and a specified area of a preceding frame; an encoding control portion connected to a buffer memory; a specified area extracting portion and a motion extracting portion to control quantizing and encoding process.

13 Claims, 10 Drawing Sheets

⊠ : SPECIFIED AREA BLOCK
⊠ : MOTION AREA BLOCK
☐ : INEFFECTIVE AREA BLOCK

IMAGE SEQUENCE ENCODING DEVICE AND AREA EXTRACTING DEVICE

BACKGROUND OF THE INVENTION

The present invention relates to an image encoding method for dividing an input image into two-dimensional blocks and orthogonally transforming, quantizing and encoding each of the blocks. More particularly, it relates to an image encoding and area extracting device which is capable of extracting a specified area and a motion area from an input image and performing controlled quantizing and encoding each of the extracted areas.

Recently, with an increasing demand for image communication services such as videophones and videoconferencing for effectively using ISDN (Integrated Services Digital Networks) and PSTN (Public switched telecommunication networks), a number of studies have been made for developing methods for more effectively encoding image information to be more effectively transmitted. These studies are directed to saving an amount of information included in an image by removing redundancy therefrom, using statistic characteristics. A "hybrid" encoding method is well known, which uses a combination of motion compensative prediction with discrete cosine transformation. However, image data encoded by the hybrid encoding method could be reproduced with noise elements in the case of transmission of the data at a low bit-rate. This problem had to be solved.

Accordingly, such a way to improve an image quality was studied wherein each of specified areas is extracted from an input image and is then quantized at a controlled quantizer stepsize (quantizing intervals). For example, there is an idea that a face area is extracted from an input image and other areas (hereinafter referred as to background area) of the image are quantized at a quantizer stepsize larger than that of the face area, i.e., with a smaller amount of codes, making it possible to assign a larger amount of the codes to an encoding of the face area and to thereby improve subjective quality of the image (R. H. J. N. Plompen, et al.: "An Image knowledge based video codec for low bitrates," SPIE Vol. 804 Advanced in image processing, 1987).

An exemplified conventional image encoding by using a motion compensative prediction method together with a two-dimensional orthogonal transform technique will be described as folows:

Image sequences taken by a television camera are digitized and inputted into the frame memory wherein each input image (frame) is divided into blocks each consisting of N×M pixels (N and M are natural numbers) and stored. A subtracter determines a difference between the input image stored in the frame memory and a motion-compensated prediction value from the motion compensative predicting portion by performing calculation per block of the image. The orthogonal transforming portion performs a two-dimensional orthogonal transform of each pixel of each block and transmits obtained coefficients of the transformation to the quantizing portion which in turn quantizes the received coefficients at a quantizer stepsize outputted by the encoding control portion. The encoding portion conducts entropy encoding of the quantized output of the quantizing portion and generates coded information.

The buffer memory stores therein the coded information in the form suited to transmission rate of a communication line.

The output signal from the quantizing portion is also given to the inverse quantizing portion wherein the output is inversely quantized to produce a coefficient. The inverse orthogonal transforming portion performs inverse two-dimensional orthogonal transform of the transform coefficients and the adder sums the value of the motion compensative prediction from the motion compensative predicting portion and the image and the summed image is stored in the frame memory. The reconstructed image stored in the frame memory and the current image stored in the frame memory are inputted into the motion detecting portion which in turn detects motion vectors.

The motion compensative predicting portion determines a motion-compensated prediction value from the motion vectors and the reconstructed image stored in the frame memory and discriminates which mode was applied for prediction, interframe or intraframe, by comparing power of the input image with power of a difference of the motion-compensated prediction value and the input image. The encoding control portion receives effective/ineffective information representative of a face area and a background area from the area extracting portion and information on occupation of the buffer memory with coded information, and determines respective quantizer stepsizes (intervals) for quantizing the face area and the background area. For instance, when the area extracting portion judges the face area to be effective and the background area to be ineffective, it determines a reference quantizer stepsize on the basis of the occupied size of the buffer memory and selects a smaller quantizer stepsize for face area than that for the background area.

The above-mentioned method has only two kinds of quantizer stepsizes for a face area and a background area and only discloses that a quantizer stepsize for the face area is smaller than a quantizer stepsize for the background area. Accordingly, when the method is applied to the practical image sequence encoding device, values dQf and dQb, which may vary depending upon a result of extraction by the area extracting portion, are defined against a quantizer stepsize Q determined according to occupation of the buffer memory with coded information, and, for example, values Q—dQf and Q+dQb may be applied for quantizing the face area and the background area respectively. This method, however, may quantize noise signals existing in the background area resulting in producing extra-coded information and correspondingly reducing the amount of codes assigned to the face area.

The face area extraction is conducted in such a manner that a figure (man or woman) is first extracted from an input image by using some kinds of human-figure extracting templates and then a face area is taken out therefrom. This method can not realize flexible extraction of a face area in an image because the using of templates that limits the size and position of a human figure to be extracted from the image. Furthermore, no correlation is provided between the extracted face area of the current image and that of a preceding image. This may result in reproducing the image of a decreased quality with discontinuity of the face area portion thereof.

For an image having a large motion area, relatively large amount of codes shall be assigned to the motion area and an allocation of codes to a face area is correspondingly reduced, that may not improve the quality of face area image which has been properly extracted.

Furthermore, improvement of the quality of a face image by changing the quantizer stepsize may not be expected when the face area occupies a relatively large or small portion of the screen image.

If an image wherein scene change occurs is encoded with a reduced amount of codes assigned to its background area, it may be reproduced with unstable quality of background being unpleasant to eyes of an observer.

It is also unreasonable that pixels of eyes, a nose and a mouth in a face area, which may sharply vary in brightness, and pixels of a skin portion thereof are quantized at the same quantizer stepsize.

In addition, there still remains such a problem that a face area of a certain increased size may have a decreased encoding efficiency.

SUMMARY OF THE INVENTION

It is an object of the present invention to provide an image (Video) sequence encoding device which is capable of extracting a specified area and a motion area from an image and quantizing and encoding the extracted areas without encoding unnecessary items included in a background area, thereby assuring an improved quality of the selected area, e.g., a face area in the image.

Another object of the present invention is to provide an area extracting device which is capable of adaptively extracting a face area from an image with due consideration of the correlation between the extracted areas of the image and the corresponding areas of the preceding stored frame, thereby assuring complete encoding of the specified area and the motion area of the input image.

Another object of the present invention is to provide an image sequence encoding device which is capable of orthogonally transforming differentials between blocks of an input image and motion compensative prediction values, quantizing and encoding thus obtained transform coefficients, generating and storing the encoded information in a buffer memory for matching with a transmission rate of a communication line, and controlling a specified area extracting means to extract a specified area from an input image and a motion area extracting means to extract a motion area from the input image on the basis of a difference of the input image from a preceding frame image and, then, to quantize and encode the areas extracted by the specified area extracting means and the motion area extracting means, producing transmittable encoded information on the specified area and the motion area.

Another object of the present invention is to provide an image sequence encoding device which is capable of extracting a specified area by first reproducing an input image to a given size, converting a colorimetric system by using a colorimetric system converting means, extracting pixels having a specified value for representing a specified area in a transformed space and judging each block, as containing the specified pixels more than a threshold preset on the basis of a encoding rate, to be significant and selectable as a component of the specified area.

Another object of the present invention is to provide an image sequence encoding device which is capable of extracting a motion area by judging whether variation of an input image from a preceding frame image exceeds a threshold predetermined on the basis of a encoding rate and determining a logic sum of the obtained significant block whose variation exceeds the threshold and significant blocks of a specified area and a motion area which are related to the preceding frame.

Another object of the present invention is to provide an image sequence encoding device which is capable of assigning a relatively large quantity of codes to a specified area by reducing allocation of codes to a motion area.

Another object of the present invention is to provide an image sequence encoding device which is capable of quantizing and encoding a whole image if a specified area occupies the image area larger than a certain threshold or a scene change has occurred.

Another object of the present invention is to provide an image sequence encoding device which is capable of controlling the quantization of a specified area according to activity in each block thereof.

Another object of the present invention is to provide an image sequence encoding device which is capable of selecting necessary blocks within a specified area according to the results of judgment on magnitude of motion vectors and results of judgment on interframe or intraframe mode of prediction and, then, quantizing and encoding the selected blocks. These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

PREFERRED EMBODIMENT OF THE INVENTION

Figure 1:
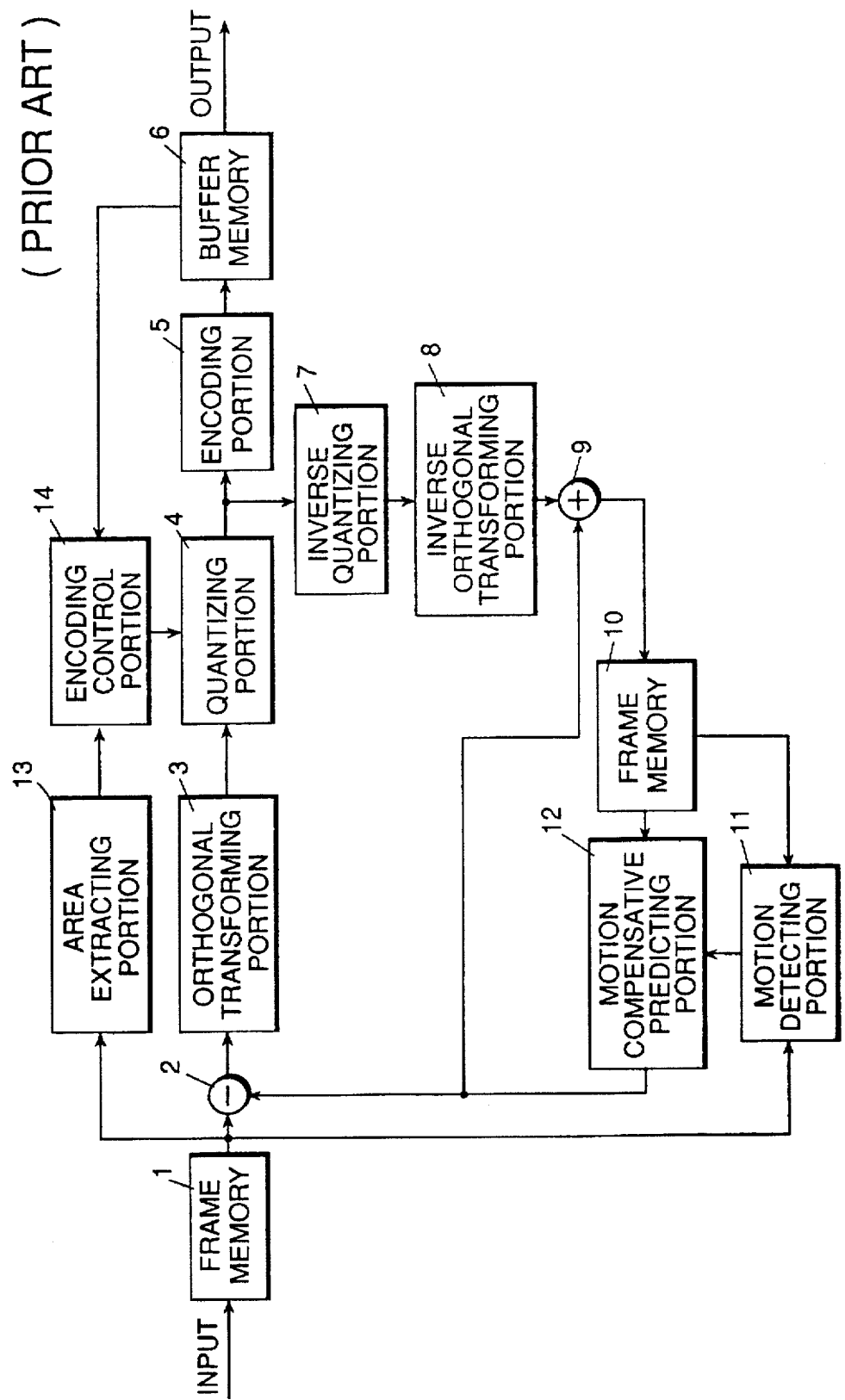
FIG. 1 is a block diagram for explaining an exemplified conventional hybrid encoding method.

Referring to FIG. 1, an exemplified conventional image encoding method by using a motion compensative prediction method together with a two-dimensional orthogonal transform technique will be described, which uses a system comprising a frame memory 1, a subtracter 2, an orthogonal transforming portion 3, quantizing portion 4, encoding portion 5, a buffer memory 6, an inverse quantizing portion 7, an inverse orthogonal transforming portion 8, an adder 9, a frame memory 10, a motion detecting portion 11, a motion compensative predicting portion 12, an area extracting portion 13 and a encoding control portion 14.

Image sequence taken by a television camera are digitized and inputted into the frame memory 1 wherein each input image (frame) is divided into blocks each consisting of N×M pixels (N and M are natural numbers) and stored. A subtracter 2 determines a difference between the input image stored in the frame memory 1 and a motion-compensated prediction value from the motion compensative predicting portion 12 by performing calculation per block of the image. The orthogonal transforming portion 3 performs a two-dimensional orthogonal transform of each pixel of each block and transmits obtained coefficients of the transformation to the quantizing portion 4 which in turn quantizes the received coefficients at a quantizer stepsize outputted by the encoding control portion 14. The encoding portion 5 conducts entropy encoding of the quantized output of the quantizing portion 4 and generates coded information.

The buffer memory 6 stores therein the coded information in the form suited to transmission rate of a communication line.

The output signal from the quantizing portion 4 is also given to the inverse quantizing portion 7 wherein the output is inversely quantized to produce a coefficient. The inverse orthogonal transforming portion 8 performs inverse two-dimensional orthogonal transform of the transform coefficients and the adder 9 sums the value of the motion compensative prediction from the motion compensative predicting portion 12 and the image and the summed image is stored in the frame memory 10. The image stored in the frame memory 10 and the image stored in the frame memory 1 are inputted into the motion detecting portion 11 which in turn detects motion vectors.

The motion compensative predicting portion 12 determines a motion-compensated prediction value from the motion vectors and the image stored in the frame memory 10 and discriminates which mode was applied for prediction, interframe or intraframe, by comparing power of the input image with power of a difference of the motion-compensated prediction value and the input image. The encoding control portion 14 receives effective/ineffective information representative of a face area and a background area from the area extracting portion 13 and information on occupation of the buffer memory 6 with encoded information and determines respective quantizer stepsizes (intervals) for quantizing the face area and the background area. For instance, when the area extracting portion 13 judges the face area to be effective and the background area to be ineffective, it determines a reference stepsize on the basis of the occupied size of the buffer memory and selects a smaller quantizer stepsize for face area than that for the background area.

Figure 2:
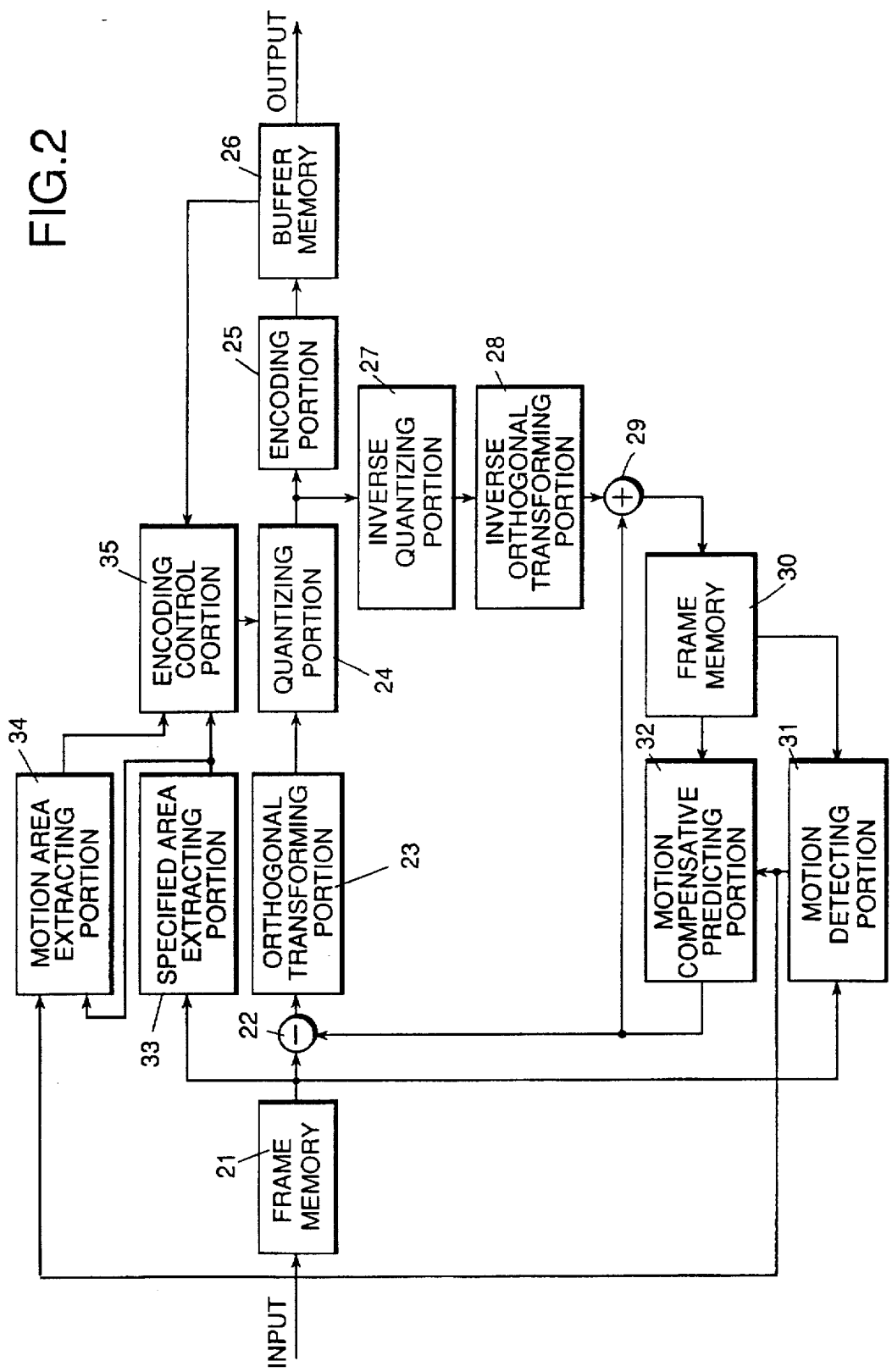
FIG. 2 is a block diagram for explaining a first embodiment of the present invention.

Referring now to the accompanying drawings, preferred embodiments of the present invention will be described in detail as follows:

FIG. 2 is a block diagram for explaining the first embodiment of the present invention, which comprises a frame memory 21 for storing an input image, a subtracter connected to the frame memory 21 and a motion compensative predicting portion 32 to calculate a difference between the input image and a motion compensative prediction value, an orthogonal transforming portion 23 connected to the subtracter 22 to orthogonally transform the difference between the input image and the motion compensative prediction value and to produce an output of transform coefficients, a quantizing portion 24 connected to the orthogonal transforming portion 23 and a encoding control portion 35 to quantize the transform coefficients from the orthogonal transforming portion 23 at a quantizer stepsize predetermined by the encoding control portion 35, a encoding portion 25 connected to the quantizing portion 24 to encode the quantized transform coefficients, a buffer memory 26 connected to the encoding portion to store therein the coded information from the encoding portion 25, an inverse quantizing portion 27 connected to the quantizing portion 24 to inversely quantize the quantized transform coefficients, an inverse orthogonal transforming portion 28 connected to the inverse quantizing portion 27 to perform inverse orthogonal transformation of the transform coefficients from the inverse quantizing portion 27, an adder 29 connected to the inverse orthogonal transforming portion 28 and the motion compensative predicting portion 32 to add a motion compensative prediction value to an image obtained by the inverse orthogonal transforming portion 28, a frame memory 30 for storing an output image from the adder 29, a motion detecting portion 31 connected to the frame memory 30 and the frame memory 21 to detect motion vectors, the motion compensative predicting portion 32 connected to the frame memory 30 and the motion detecting portion 31 to determine motion compensative prediction value, a specified area extracting portion 33 connected to the frame memory 21 to extract a specified area from an input image, a motion area extracting portion 34 connected to the motion detecting portion 31 and the specified area extracting portion 33 to extract a motion area according to a motion vector magnitude and a specified area of the preceding frame image, and a encoding control portion 35 connected to the buffer memory 26, the specified area extracting portion 33 and the motion area extracting portion 34 to control quantizing and encoding operations.

The operation of the image sequence encoding device constructed as described above is as follows:

The frame memory 21 stores input images in a common format (CIF or QCIF) according to ITU-T Recommendation H.261. In the subtracter 22, a difference between an input image stored in the frame memory 21 and a motion compensative prediction value determined by the motion compensative predicting portion 32 is obtained per block consisting of, e.g., 8×8 pixels and is converted from time area signal to frequency area signal by two-dimensional discrete cosine transformation (DCT). DCT coefficients obtained are then outputted to the quantizing portion 24.

The quantizing portion 24 quantizes DCT coefficients according to a quantizer stepsize of quantization determined by the encoding control portion 35 to attain a high encoding efficiency by reducing DCT coefficients to be encoded. Thus quantized DCT coefficients are outputted to the encoding portion 25.

The encoding portion 25 performs entropy encoding for adaptively allocating codes to the quantized DCT coefficients to produce and output encoded information consisting of variable-length codes.

The buffer memory 26 stores therein encoded information generated by the encoding portion 25 to output later therefrom at a constant speed matched with a transmission rate of a communication line. An amount of encoded information by which the buffer memory 26 is occupied is inputted into the encoding control portion 35.

The inverse quantizing portion 27 performs inverse quantization of the DCT coefficients, which is reverse processing to that made in the quantizing portion 24. The inversely quantized DCT coefficients are sent to the inverse orthogonal transforming portion 28 wherein they are subjected to two-dimensional inverse discrete cosine transformation. The output image of the inverse orthogonal transforming portion 28 and a motion compensative prediction value of the motion compensative predicting portion 32 are summed by the adder 29. The calculation result is stored in the frame memory 30.

The motion detecting portion 31 detects motion vectors between the image stored in the frame memory 30 and the image stored in the frame memory 21 and transfers the detected motion vectors to the motion compensative predicting portion 32.

The motion compensative predicting portion 32 determines a motion compensative prediction value on the basis of the image stored in the frame memory 30 and motion vectors detected by the motion detecting portion 31. It carries out interframe prediction or intraframe prediction by comparing power of the difference between the input image and the motion compensative prediction value with power of the input image.

Figure 3:
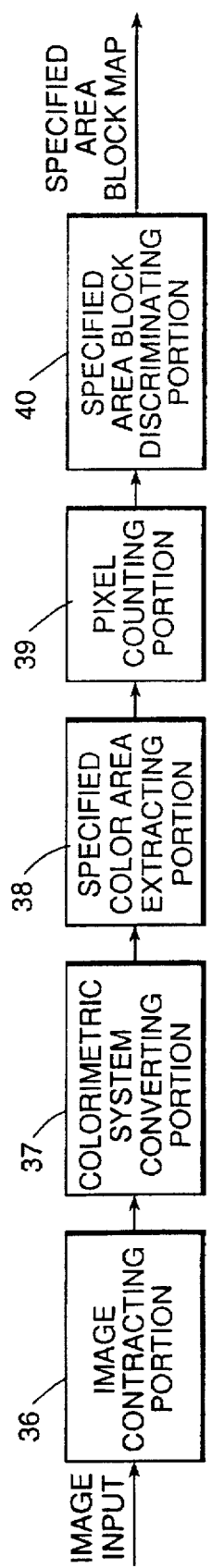
FIG. 3 is a block diagram showing an embodiment of a specified area extracting portion.

The specified area extracting portion 33 extracts a specified area which is a subject to be improved in its image quality. In case of application of the video encoding device for, e.g., videophones and videoconferencing, it may be generally understood that a face area of each image is most remarkable to recognize and, therefore, the image may be subjectively improved in its quality by extracting and improving the face area only. Accordingly, a method of extracting a face area regarded as a specified area will be described below:

FIG. 3 is a construction view of the specified are extracting portion 33 which is provided with an image contracting portion 36 connected to a frame memory 21 to reduce input image to a specified size, a colorimetric system converting portion 37 connected to the image contracting portion 36 to convert the colorimetric system of the image, a specified color area extracting portion 38 connected to the colorimetric system converting portion 37 to extract pixels having a specified color, a pixel counting portion 39 connected to the specified color area extracting portion 38 to count specified color pixels per block and a specified area block discriminating portion 40 connected to the pixel counting portion 39 to discriminate a unit significant block according to the results of counting pixels per block.

Figure 4:
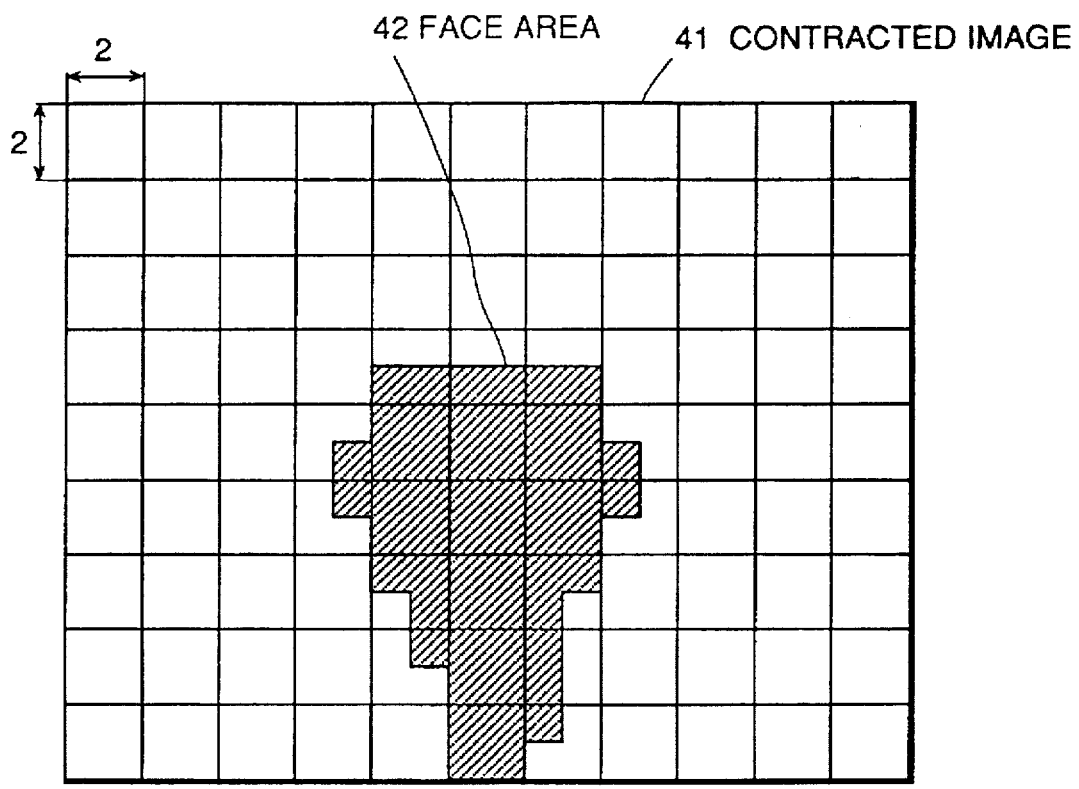
FIG. 4 is illustrative of a face area in an image reduced in size.

The operation of the above-mentioned specified area extracting portion 33 is as follows:

The image contracting portion 36 receives components Y, Cr and Cb of an input image from the frame memory 21 and prepares respective contracted images of a specified size. The reduction of image size is effective to reduce processing time and furthermore to clear off negligible variations in brightness and color, leaving only effective information. Now, it is supposed that components Y are averaged per block of 4×4 pixels and reduced to 1/16 of the input image size and components Cr and Cb are averaged per block of 2×2 pixels and reduced to 1/4 of the input image size. In the contracted image, a block whose size corresponds to a block size of the input image is called a unit block. FIG. 4 shows a contracted image 41 divided into unit-blocks each consisting of 2×2 pixels.

The colorimetric system converting portion 37 converts a contracted image of YCrCb colorimetric system to a contracted image of HSV colorimetric system. The HSV colorimetric system is known as so-called perceptive colorimetric system familiar to human perception. In comparison with the YCrCb colorimetric system wherein color components are correlated, the HSV colorimetric system has a low correlation between color components, which is therefore adapted for dividing an image into areas according to color components.

The conversion is realized in two steps, i.e., components Y, Cr, Cb is first converted to components of the RGB colorimetric system according to equations (1)–(3) and then to components of the HSV colorimetric system according to equations (4)–(6).

$$R = Y + 1.4020 Cr \tag{1}$$

$$G = Y - 0.3441 Cb - 0.7139 Cr \tag{2}$$

$$B = Y + 1.7718 Cb - 0.0012 Cr \tag{3}$$

$$H = \cos^{-1}(((R-G)+(R-B))/(2((R-G)^2+(R-B)(g-B))^{1/2}) \tag{4}$$

$$S = (\max(R, G, B) - \min(R, G, B))/ \tag{5}$$

$$V = \max(R, G, B) \tag{6}$$

The specified color area extracting portion 38 extracts a face area from a contracted image of component H which in the HSV colorimetric system is most stable and least affected by shading and shadows. Pixels whose values Hi,j satisfies the following condition are extracted from an image of component H.

$$Th_{HL} < Hi,j < Th_{Hu} \tag{7}$$

where $Th_{HL}$ and $Th_{Hu}$ are threshold values for extracting a face area. The extracted pixels will form a face area 42 shown in FIG. 4.

The pixel counting portion 39 counts specified color pixels existing in each unit block of the face area determined by the specified color area extracting portion 38. A result of counts per unit block is entered into the specified area block discriminating portion 40.

Figure 5:
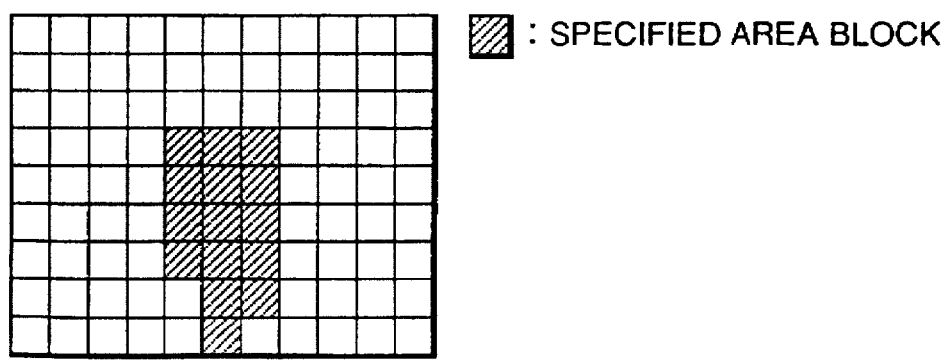
FIG. 5 is illustrative of a map of specified area blocks.

The specified area block discriminating portion 40 discriminates significance of each unit block by comparing the result of counts obtained therein by the pixel counting portion 39 with a threshold for judgment. Any block is judged to be significant or not significant if it contains more pixels or fewer pixels than the threshold value. A block map of 1 frame image is obtained and outputted. The threshold value for discriminating significant blocks is preset according to a encoding rate. When a encoding rate is low, it is desirable to increase the threshold value to get more effective unit blocks by eliminating blocks each containing a small number of pixels counted by the pixel counting portion 39. When an encoding rate is high, a smaller threshold is used to extract blocks having a less amount of pixels counted by the pixel counting portion 39. Thus, the threshold may vary in such a way that its value stepwise decreases as the encoding rate stepwise increases. FIG. 5 shows a result of discriminating the face area shown in FIG. 4 according to a certain threshold value, wherein blocks containing a small number of pixels are removed from a face area and effective blocks are extracted as a specified area. A map of thus obtained specified area blocks in a frame image is selected as a map of blocks of the specified area.

The motion area extracting portion 34 extracts a motion area from an input image according to motion vectors outputted from the motion detecting portion 31 and a map of specified area blocks of a preceding frame.

Figure 6:
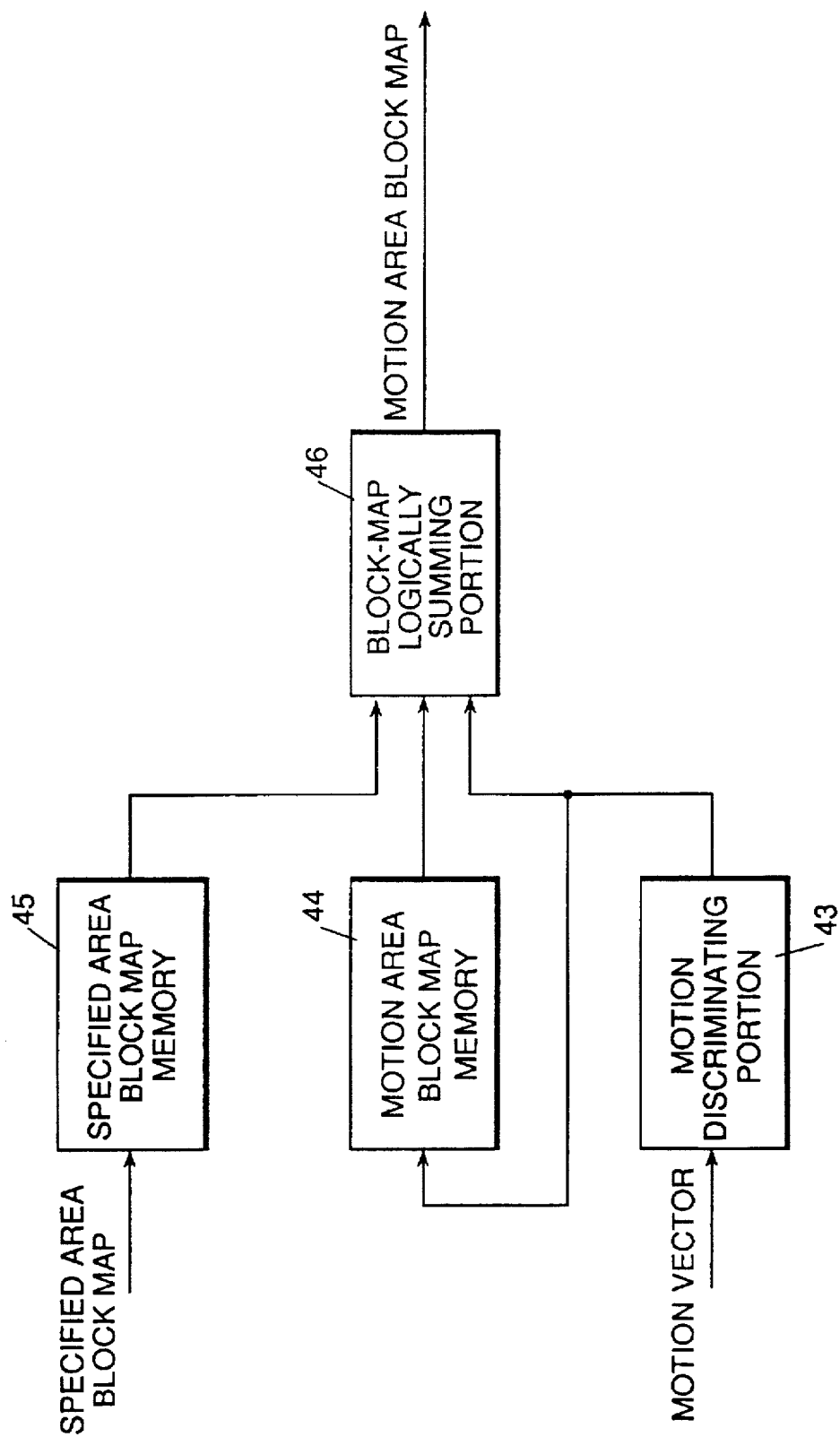
FIG. 6 is a block diagram showing an embodiment of a motion area extracting portion.

FIG. 6 is a construction view of the motion area extracting portion 34 which is provided with a motion discriminating portion 43 connected to the motion detecting portion 31 and used for discriminating the motion according to state of motion vectors; a motion area block map memory 44 connected to the motion discriminating portion 43 and used for storing a map of blocks judged to be of a motion area; and a block map logically summing portion 46 that is connected to the motion discriminating portion 43, the motion area block map memory 44 and the specified area block map memory 45 to determine a logical sum of a motion area block map of an input image, a motion area block map of a preceding frame and a specified area block map of the preceding frame.

The operation of the above-mentioned motion area extracting portion 34 is as follows:

The motion discriminating portion 43 receives data on motion vectors mvx (in direction x) and mvy (in direction y) from the motion detecting portion 31 and determines a motion vector value "mv" of each block according to the following equation:

$$mv = mvx + mvy \tag{8}$$

Figure 7B:
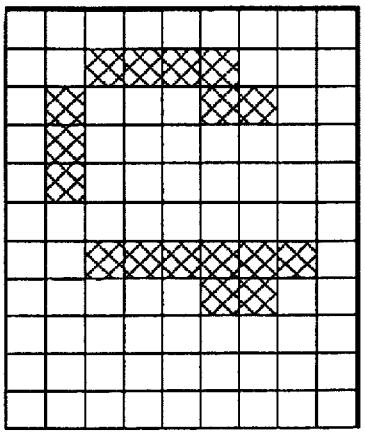
FIGS. 7A, 7B, 7C and 7D are illustrative of a map of motion area blocks.
Figure 7A:
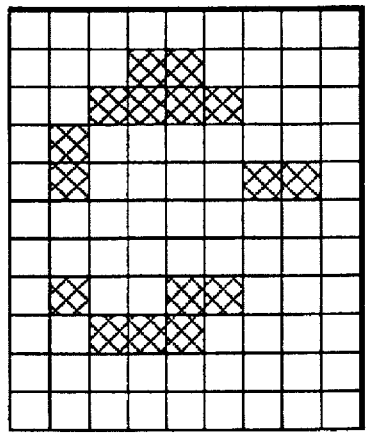

The obtained value mv of each block is compared with a threshold and judged whether the former exceeds the latter or not. All blocks having a value mv exceeding the threshold are selected as motion blocks and a map of the motion area blocks for a frame is prepared and outputted by the motion discriminating portion 43. The threshold shall be set at an adequate value depending upon an encoding rate. When an encoding rate is low, the threshold value shall be increased to extract blocks each showing a distinct motion, eliminating blocks of a small "mv" value. When an encoding rate is high, the threshold value shall be decreased to extract blocks having a small "mv" value, thereby assuring accurate transmission of a minute motion of video sequence. The threshold may vary in such a way that its value stepwise decreases as the encoding rate stepwise increases. FIG. 7A shows a result of discriminating motion values of motion area blocks. A map of thus obtained motion area blocks in a frame image is selected as a map of blocks of a specified area.

The motion area block map memory 44 stores therein a map of motion area blocks from the motion discriminating portion 43. This memory is designed to be a double buffering memory capable of storing two maps of motion area blocks, i.e., one for current input frame and the other for preceding frame.

Figure 7D:
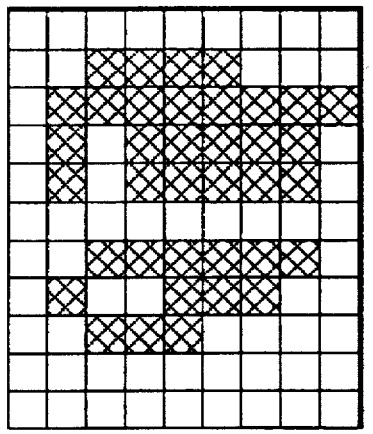
Figure 7C:
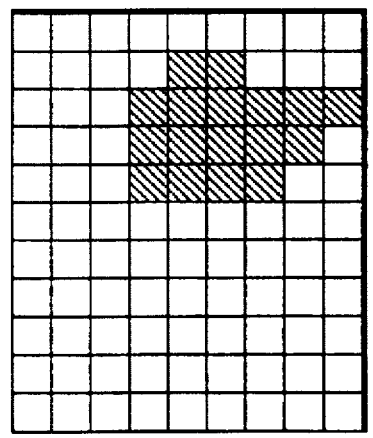

To prevent lack of a specified area and a motion area of the preceding frame, the block map logically suming portion 46 determines a logical sum of a motion area block map of an input image (FIG. 7A) from the motion discriminating portion 43, a motion area block map of a preceding frame of a preceding frame (FIG. 7B) from the motion area block map memory 44 and a specified area block map of the preceding frame (FIG. 7C) from the specified area block map memory 45, thereby obtaining a new map of the motion area blocks as shown in FIG. 7D. By doing so, all the specified area and motion area may be completely encoded and thereby be free from impairment of its reproduction quality.

Figure 8:
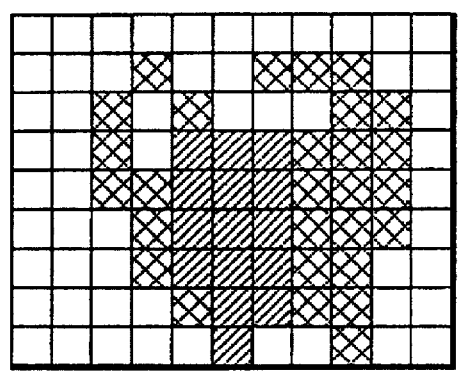
FIG. 8 is illustrative of a map of encoded blocks.

The encoding control portion 35 controls the quantizer 24 according to the specified area block map obtained by the specified area extracting portion 33 and the motion area block map obtained by the motion area extracting portion 34. A coded block map is prepared by combining the specified area block map with the motion area block map as shown in FIG. 8. Blocks hatched and blackened in FIG. 8 relate to the specified area and the motion area respectively. All other blocks are ineffective blocks. The encoding control portion 35 controls the quantizer to quantize transform coefficients outputted from the orthogonal transforming portion 23, which correspond to the specified area blocks or motion area blocks in the coded block map. The quantizer 24 may is controlled to have a zero output for an ineffective block detected in the coded block map. If quantizer stepsizes of quanyizing a specified area block and a motion area block within a frame image are expressed as Qs and Qm respectively, the following condition shall be satisfied.

$$Qs < Qm \tag{9}$$

This means that the specified blocks shall have more codes than the motion area blocks. By doing so, the specified area, i.e., a face area can be transmitted with high quality and the motion area can also be encoded with a certain number of codes, thereby eliminating the possibility of occurrence of discontinuity of reproduced image and preventing impairment of the reproducable image quality.

To effectively improve the image quality of the specified area, the encoding control portion 35 controls quantizer to quantize all blocks of the input image at a specified quantizer stepsize without using the encoded block map when the number (Ns) of the specified blocks in an encoded block map of one frame satisfies either of the following conditions:

$$Ns \leq Th_{n1} \text{ (First threshold)} \tag{10}$$

or $$Ns \leq Th_{n2} \text{ (Second threshold)} \tag{11}$$

where $$Th_{n1} < Th_{n2}.$$

The above-mentioned quantizer stepsizes are adjusted, observing the occupancy of the buffer memory 26 so as not to cause overflow or underflow therein.

Figure 9:
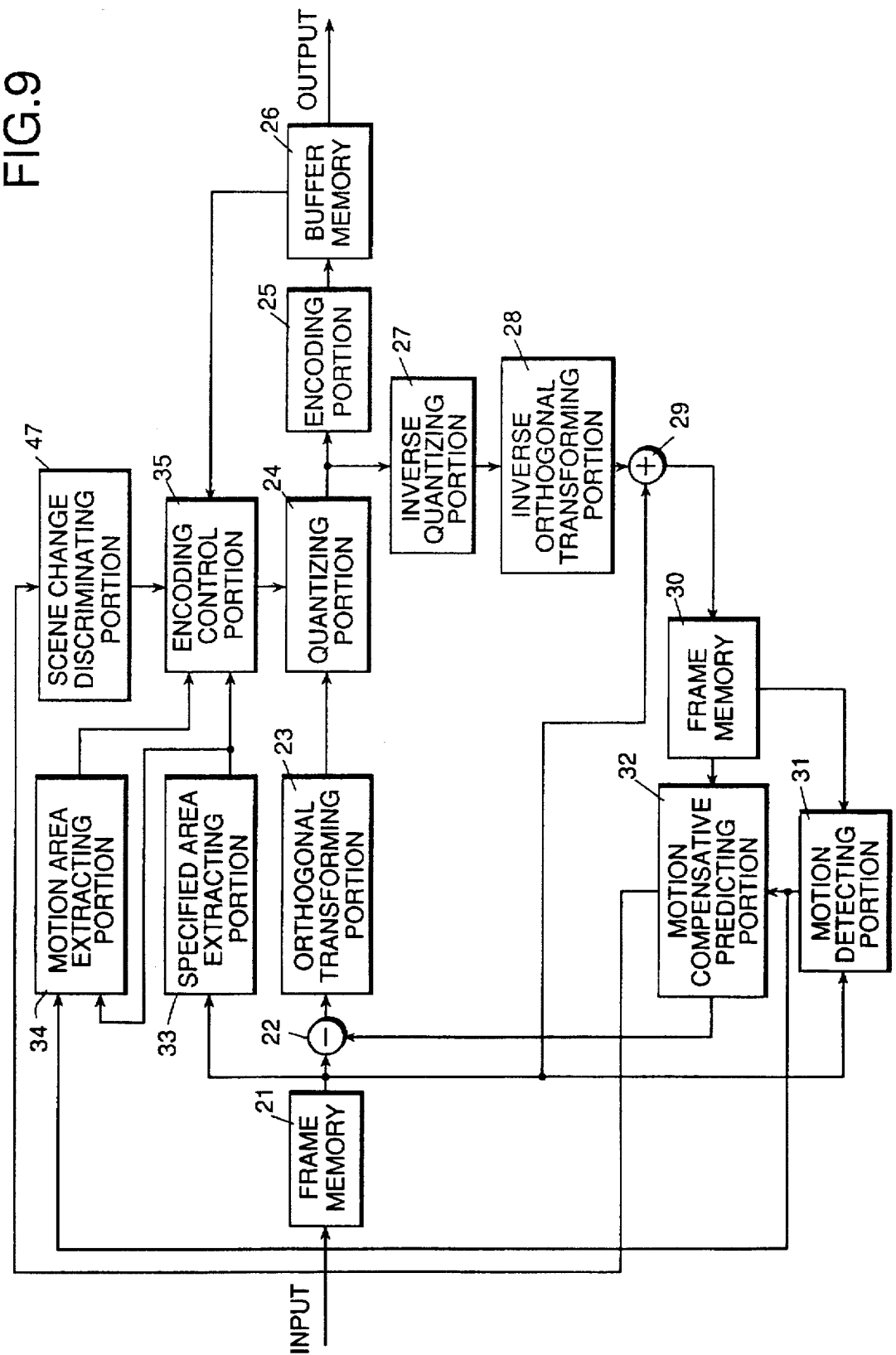
FIG. 9 is a block diagram for explaining a second embodiment of the present invention.

Another embodiment of the present invention will be described in detail as follows:

FIG. 9 is a block diagram showing the second embodiment of this invention. Components similar to those shown in FIG. 2 are given the same reference numerals.

In FIG. 9, an image sequence encoding device is provided with a frame memory 21 for storing therein an input image; a subtracter 22 connected to the frame memory 21 and a motion compensative predicting portion 32 to determine a difference between the input image and a motion compensative prediction value; an orthogonal transforming portion 23 connected to the subtracter 22 to perform orthogonal transform of the difference between the input image and the motion prediction value and to produce transform coefficients; a quantizing portion 24 connected to the orthogonal transforming portion 23 and a encoding control portion 35 to quantize the transform coefficients from the orthogonal transforming portion 23 at a quantizer stepsize predetermined by the encoding control portion 35; a encoding portion 25 connected to the quantizing portion 24 to encode the quantized transform coefficients; a buffer memory 26 connected to the encoding portion 25 to store therein the encoded information from the encoding portion 25; an inverse quantizing portion 27 connected to the quantizing portion 24 to inversely quantize the quantized transform coefficients; a inverse orthogonal transforming portion 28 connected to the inverse quantizing portion 27 to perform inverse orthogonal transform of the transform coefficients from the inverse quantizing portion 27; an adder 29 connected to the inverse orthogonal transforming portion 28 and the motion compensative predicting portion 32 to add a motion compensative prediction value to an image obtained by the inverse orthogonal transforming portion 28; a frame memory 30 connected to the adder 29 to store a output image of the adder 29; a motion detecting portion 31 connected to the frame memory 30 and the frame memory 21 to detect motion vectors; the motion compensative predicting portion 32 connected to the frame memory 30 and the motion detecting portion 31 to determine motion compensative prediction value; a specified area extracting portion 33 connected to the frame memory 21 to extract a specified area from an input image; a motion area extracting portion 34 connected to the motion detecting portion 31 and the specified area extracting portion 33 to extract a motion area according to a motion vector magnitude and a specified area of the preceding frame image; a scene change discriminating portion 47 connected to the motion compensative predicting portion 32 to discriminate the change of a scene; and a encoding control portion 35 connected to the buffer memory 26, the specified area extracting portion 33, the motion area extracting portion 34 and the scene change discriminating portion 47 to control quantizing and encoding operations.

The operation of the video encoding device constructed as described above is as follows:

Components which are similar in function to those shown in FIG. 2 will not be further explained.

The scene change discriminating portion 47 receives the result of judgment on prediction mode (interframe or intraframe) from the motion compensative predicting portion 32. When a frame contains blocks judged as intraframely predicted in a quantity (Nintra) more than a threshold $Th_c$ for scene change judgment.

$$Nintra > Th_c \qquad (12)$$

the scene change discriminating portion decides that change of the scene occurs in the frame and informs the encoding control portion 35 of said decision:

Having been informed of the occurrence of the scene change by the scene change discriminating portion 47, the encoding portion 35 controls the quantizing portion 24 to quantize all blocks of the frame at a specified quantizer stepsize, not following the encoded block map prepared by combining the motion area block map obtained by the motion area extracting portion 34 with the specified area block map obtained by the specified area extracting portion 33. This operation is intended to early stabilize a background area of the image when change of a scene occurred therein and, therefore, shall be repeated on several frames in succession to the scene-changed frame until the image quality becomes stabilized.

The above-mentioned quantizer stepsize shall be adjusted, observing the occupancy of the buffer memory 28 not to cause overflow or underflow therein.

Figure 10:
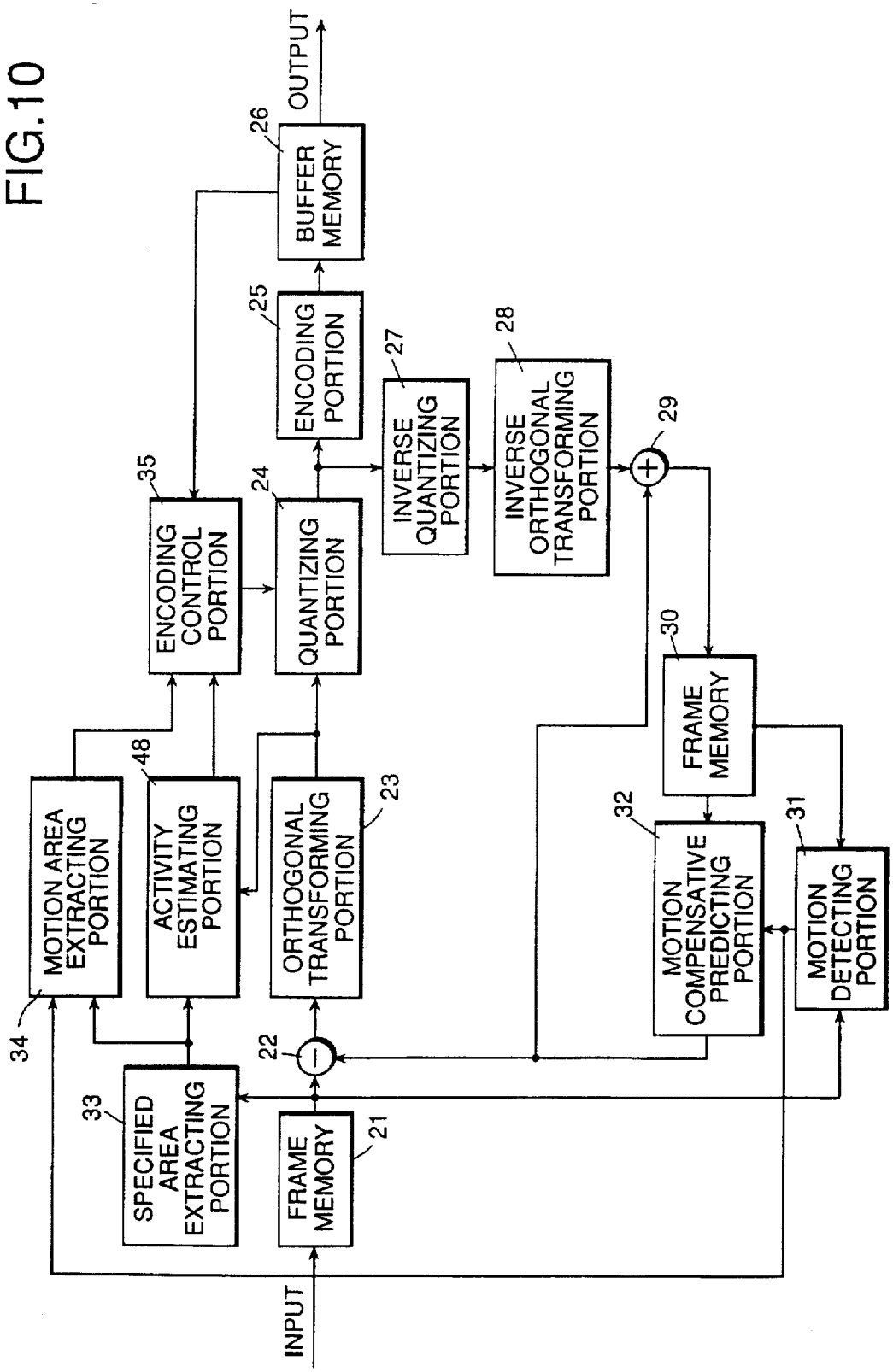
FIG. 10 is a block diagram for explaining a third embodiment of the present invention.

Another embodiment of the present invention will be described in detail as follows:

FIG. 10 is a block diagram showing the third embodiment of this invention. Components similar to those shown in FIG. 2 are given the same reference numerals.

In FIG. 10, a video encoding device is provided with a a frame memory 21 for storing therein an input image; a subtracter 22 connected to the frame memory 21 and a motion compensative predicting portion 32 to determine a difference between the input image and a motion compensative prediction value; an orthogonal transforming portion 23 connected to the subtracter 22 to perform orthogonal transform of the difference between the input image and the motion prediction value and to produce transform coefficients; a quantizing portion 24 connected to the orthogonal transforming portion 23 and a encoding control portion 35 to quantize the transform coefficients from the orthogonal transforming portion 23 at a quantizer stepsize determined by the encoding control portion 35; a encoding portion 25 connected to the quantizing portion 24 to encode the quantized transform coefficients; a buffer memory 26 connected to the encoding portion 25 to store therein the encoded information from the encoding portion 25; an inverse quantizing portion 27 connected to the quantizing portion 24 to inversely quantize the quantized transform coefficients; a inverse orthogonal transforming portion 28 connected to the inverse quantizing portion 27 to perform inverse orthogonal transform of the transform coefficients from the inverse quantizing portion 27; an adder 29 connected to the inverse orthogonal transforming portion 28 and the motion compensative predicting portion 32 to add a motion compensative prediction value to an image obtained by the inverse orthogonal transforming portion 28; a frame memory 30 connected to the adder 29 to store a output image of the adder 29; a motion detecting portion 31 connected to the frame memory 30 and the frame memory 21 to detect motion vectors; the motion compensative predicting portion 32 connected to the frame memory 30 and the motion detecting portion 31 to determine a motion compensative prediction value; a specified area extracting portion 33 connected to the frame memory 21 to extract a specified area from an input image; a motion area extracting portion 34 connected to the motion detecting portion 31 and the specified area extracting portion 33 to extract a motion area according to a motion vector magnitude and a specified area of the preceding frame image; an activity estimating portion 48 connected to the orthogonal transforming portion 23 and the specified area extracting portion 33 to calculate power of AC components in each block; and a encoding control portion 35 connected to the buffer memory 26, the motion area extracting portion 34 and the activity estimating portion 48 to control quantizing and encoding process.

The operation of the image sequence encoding device constructed as described above is as follows:

Components which are similar in function to those shown in FIG. 2 will not be further explained.

The activity estimating portion 48 calculates power Pac of AC components of a DCT block having Y-components of 8×8 pixels for each specified area block obtained at the specified area extracting portion 33 according to the following equation:

$$Pac = \sum_{u=0}^{8} \sum_{v=0}^{8} F(u, v)^2 - F(0, 0)^2 \qquad (13)$$

where F(u, v) shows a coefficient of DCT.

Pac is compared with a specified threshold $Th_{acr}$ Any block whose power Pac is more than the threshold $Th_{act}$ is judged to have significant activity. This processing may classify specified area blocks in a map into specified area blocks having significant activity and specified area blocks having not significant activity.

The encoding control portion 35 controls the quantizer 24 according to the specified area block map processed by the activity estimating portion 48 and a motion area block map prepared by a motion area extracting portion 34. A map of blocks to be coded is prepared by combining the motion area block map with the specified area block map. The quantizer 24 is controlled to quantize a transform coefficient outputted from the orthogonal transforming portion 23 if the coefficient relates to a coded block of the specified area or the motion area in the coded map and to generate a zero output if the coefficient corresponds to an ineffective block in the map.

When a specified area block of significant activity, a specified area block of not-significant activity and a motion area block are quantized at quantizer stepsizes Qsv, Qsi and Qm respectively under the following condition $$Qsv < Qsi < Qm \qquad (14),$$

significantly active blocks of the specified area may have more codes than insignificantly active blocks thereof. By doing so, important items such as eyes, a nose and a mouth that may have sharply varying brightness in a face area can be transmitted at a high image quality. By increasing the quantizer stepsize the motion area blocks it is possible to correspondingly increase an amount of codes assignable to the specified area blocks.

The above-mentioned quantizer stepsizes shall be adjusted, observing the occupancy of the buffer memory 26 not to cause overflow or underflow therein.

Figure 11:
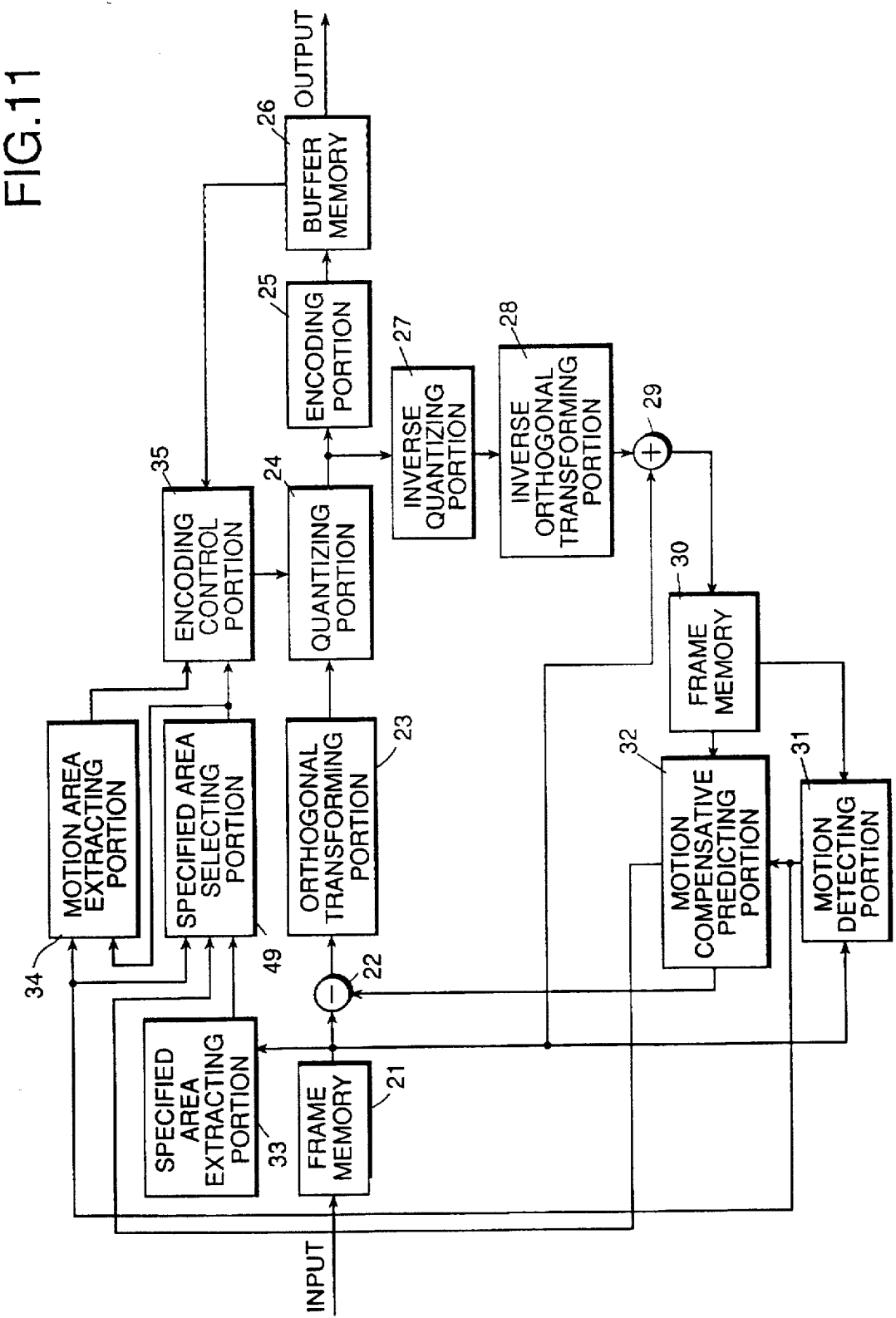
FIG. 11 is a block diagram for explaining a fourth embodiment of the present invention.

Another embodiment of the present invention will be described in detail as follows:

FIG. 11 is a block diagram showing the fourth embodiment of this invention. Components similar to those shown in FIG. 2 are given the same reference numerals.

In FIG. 11, an image sequence encoding device is provided with a frame memory 21 for storing therein an input image; a subtracter 22 connected to the frame memory 21 and a motion compensative predicting portion 32 to determine a difference between the input image and a motion compensative prediction value; an orthogonal transforming portion 23 connected to the subtracter 22 to perform orthogonal transform of the difference between the input image and the motion prediction value and to produce transform coefficients; a quantizing portion 24 connected to the orthogonal transforming portion 23 and a encoding control portion 35 to quantize the transform coefficients from the orthogonal transforming portion 23 at a quantizer stepsize determined by the encoding control portion 35; a encoding portion 25 connected to the quantizing portion 24 to encode the quantized transform coefficients; a buffer memory 26 connected to the encoding portion 25 to store therein the encoded information from the encoding portion 25; an inverse quantizing portion 27 connected to the quantizing portion 24 to inversely quantize the quantized transform coefficients; a inverse orthogonal transforming portion 28 connected to the inverse quantizing portion 27 to perform inverse orthogonal transform of the transform coefficients from the inverse quantizing portion 27; an adder 29 connected to the inverse orthogonal transforming portion 28 and the motion compensative predicting portion 32 to add a motion compensative prediction value to an image obtained by the inverse orthogonal transforming portion 28; a frame memory 30 connected to the adder 29 to store a output image of the adder 29; a motion detecting portion 31 connected to the frame memory 30 and the frame memory 21 to detect motion vectors; the motion compensative predicting portion 32 connected to the frame memory 30 and the motion detecting portion 31 to determine motion compensative prediction value; a specified area extracting portion 33 connected to the frame memory 21 to extract a specified area from an input image; a specified area selecting portion 49 connected to the specified area extracting portion 33, the motion detecting portion 31 and the motion compensative predicting portion 32 to selectively classify blocks of a specified area according to motion vectors and prediction mode discrimination result; a motion area extracting portion 34 connected to the motion detecting portion 31 and the specified area extracting portion 33 to extract a motion area according to a motion vector magnitude and; and a encoding control portion 35 connected to the buffer memory 26, the motion area extracting portion 34, the specified area selecting portion 49 to control the quantizing and encoding process.

The operation of the image sequence encoding device constructed as described above is as follows:

Components which are similar in function to those shown in FIG. 2 will not be further explained.

The specified area selecting portion 49 selects useful blocks in a specified area obtained by the specified area extracting portion 33 by performing the following processing steps:

From motion vectors mvx in x-direction and mvy in y-direction outputted per block from the motion selecting portion 31, a value mv of a block is first calculated according to the equation (8) and then is compared with a specified threshold. The block is left as a component of the specified area if its value mv exceeds the threshold. The block has a value mv less than the threshold but may still be left as a component of the specified area when the encoding mode discriminated by the motion compensative predicting portion 32 is intraframe mode. If the encoding mode is interframe, the block shall be removed from the specified area. A new map of the specified area blocks is now obtained and transferred to the motion area extracting portion 34. Further processing steps to be performed by the motion extracting portion 34 and the encoding control portion 35 are the same as described before for the first embodiment. As mentioned above, the encoding efficiency may be increased by selecting more effective specified area according to the motion vectors and the encoding mode.

As is apparent from the foregoing, the present invention has the following advantages:

A specified area of an input image and a motion area as a difference between an input image and a preceding frame image are extracted and encoded, thereby preventing encoding noise signals existing in a background of the input image. This saves extra-encoding and thereby can increase allocation of codes to a specified area and motion area of the image.

An input image wherefrom a specified area will be extracted is first contracted to a specified size, thereby time required for further processing may be reduced and small variations of brightness and color difference may disappear, leaving only effective information on the image. The contracted image is subjected to conversion of its colorimetric system and then extraction of pixels representative of the specified area therefrom in the converted space, making it possible to freely extract the specified area from the image without using templates. Furthermore, the number of pixels contained in each block of a specified area is compared with a threshold preset on the basis of an encoding rate and, thereby, the specified area adapted for the encoding rate can be extracted.

A motion area block map of an input image, a motion area block map of a preceding frame image and a specified area block map of the preceding frame image are logically summed up, thereby assuring complete encoding of the specified area and the motion area with an increased quality of the reproducable image.

By saving codes to be used for the motion area it is possible to assign a relatively larger amount of codes to the specified area of the input image which may have an improved quality.

All blocks of the input image are quantized and encoded to assure a stabilized reproduction quality if the specified area occupies the input image (screenful) larger than a specified threshold and smaller than another specified threshold.

In case of the scene change occurring in an input image, all blocks of the input image are quantized and encoded to assure a stabilized reproduction quality.

Quantization of a specified area is also controlled according to activity of each block thereof. This makes it possible to improve the image quality of the blocks that may sharply change brightness.

A specified area can be composed of more effective blocks selected according to motion vectors and interframe prediction or intraframe prediction mode. The encoding efficiency of the image can be thus improved. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An image sequence encoding device comprising:

first means for dividing a frame of an image sequence into blocks, each including N×M pixels, N and M being natural numbers;

second means for detecting a motion vector of a block of a current input frame by comparing said block with a corresponding block of a preceding frame;

third means for obtaining a motion compensative prediction value of the current frame block from the detected motion vector by interframe prediction or intraframe prediction;

fourth means for calculating a difference between the motion compensative prediction value and the current input frame value;

fifth means for obtaining a transform coefficient by orthogonal transformation of the calculated difference;

quantizing means for quantizing the transform coefficient;

encoding means for encoding the quantized transform coefficient to produce coded information;

transmission means for transmitting the encoded information to a receiving terminal over a communication line, which is provided with a buffer memory for matching the encoded information with a transmission rate on the communication line;

specified area extracting means for extracting a specified area from an input image;

motion area extracting means for extracting a motion area by determining a difference between a block of a current input frame from a block of a preceding frame; and encoding control means for controlling the quantizing means and the encoding means to respectively quantize and then encode the area extracted by the specified area extracting means and the area extracted by the motion area extracting means, wherein the encoding control means controls the quantizing means to quantize only the areas extracted by the motion area extracting means and the specified area extracting means and to vary the encoding rate for the area extracted by the motion area extracting means based upon significance of the area extracted by the specified area extracting means.

2. The image sequence encoding device of claim 1, wherein the encoding control means controls the quantizing means and the encoding means to relatively increase an amount of codes assigned to an area extracted by the specified area extracting means by reducing an amount of codes assigned to an area extracted by the motion area extracting means.

3. The image sequence encoding device of claim 1, wherein the encoding control means controls the quantizing means and the encoding means to quantize and encode an entire frame irrespective of results of the specified area extracting means and the motion area extracting means when the number of areas extracted by the specified area extracting means is less than a first predetermined threshold or is more than a second predetermined threshold.

4. The image sequence encoding device of claim 1, further comprising:

scene change judging means for detecting a scene change, wherein the encoding control means controls the quantizing means and the encoding means to quantize and encode an entire frame irrespective of results of the specified area extracting means and the motion area extracting means when a scene change is detected.

5. The image sequence encoding device of claim 1, further comprising:

activity estimating means for determining a power of coefficients in each block of pixels within each area extracted by the specified area extracting means, wherein the encoding control means controls the quantizing means and the encoding means to quantize and encode each block of pixels according to the coefficient power determined by the activity estimating means.

6. The image sequence encoding device of claim 1, further comprising:

specified area selecting means for selecting blocks of pixels within a specified area extracted by the specified area extracting means according to a motion vector detected by the motion detecting means and the mode of interframe or intraframe prediction determined by the third means, wherein the encoding control means controls the quantizing means and the encoding means to quantize and encode each block of the specified frame according to the selection made by the specified area selecting means.

7. The image sequence encoding device of claim 2 further comprising:

activity estimating means for determining a power of coefficients in each block of pixels within each area extracted by the specified area extracting means, means and the encoding means to quantize and encode each block of pixels according to the coefficient power determined by the activity estimating means.

8. The image sequence encoding device of claim 3, further comprising:

activity estimating means for determining a power of coefficients in each block of pixels within each area extracted by the specified area extracting means, wherein the encoding control means controls the quantizing means and the encoding means to quantize and encode each block of pixels according to the coefficient power determined by the activity estimating means.

9. The image sequence encoding device of claim 1, wherein the specified area extracting means includes a means for determining significance of pixels within the extracted area by comparison to a variable threshold, and the motion area extracting means includes a means for determining significant motion between pixels within the extracted motion area by comparison to a variable threshold, wherein the encoding rate decreases and the variable threshold for the extracted motion area increases as the encoding rate increases for the area extracted by the specified area extracting means.

10. The image sequence encoding device of claim 1, wherein the motion area extracting means includes a summing means for summing the area extracted by the specified area extracting means and the extracted motion area.

11. The image sequence encoding device of claim 1, wherein the specified area extracting means determines significance of pixels within the extracted area based upon a comparison of a number of pixels of a specified color to the variable threshold.

12. The image sequence encoding device of claim 11, wherein pixels within the extracted area are converted into color codes with low correlation between color components prior to determining significance.

13. The image sequence encoding device of claim 12, wherein the pixels with the extracted area are first divided into blocks of a predetermined size, converted, a number of pixels within a block which are a specified color are counted and the number counted is compared to the variable threshold to determined if a block is significant and should be encoded.